Nov. 16, 1965     M. E. SIMMONS     3,217,348
RECIPROCATING PALLET CLEANER
Filed Sept. 13, 1963     2 Sheets-Sheet 2
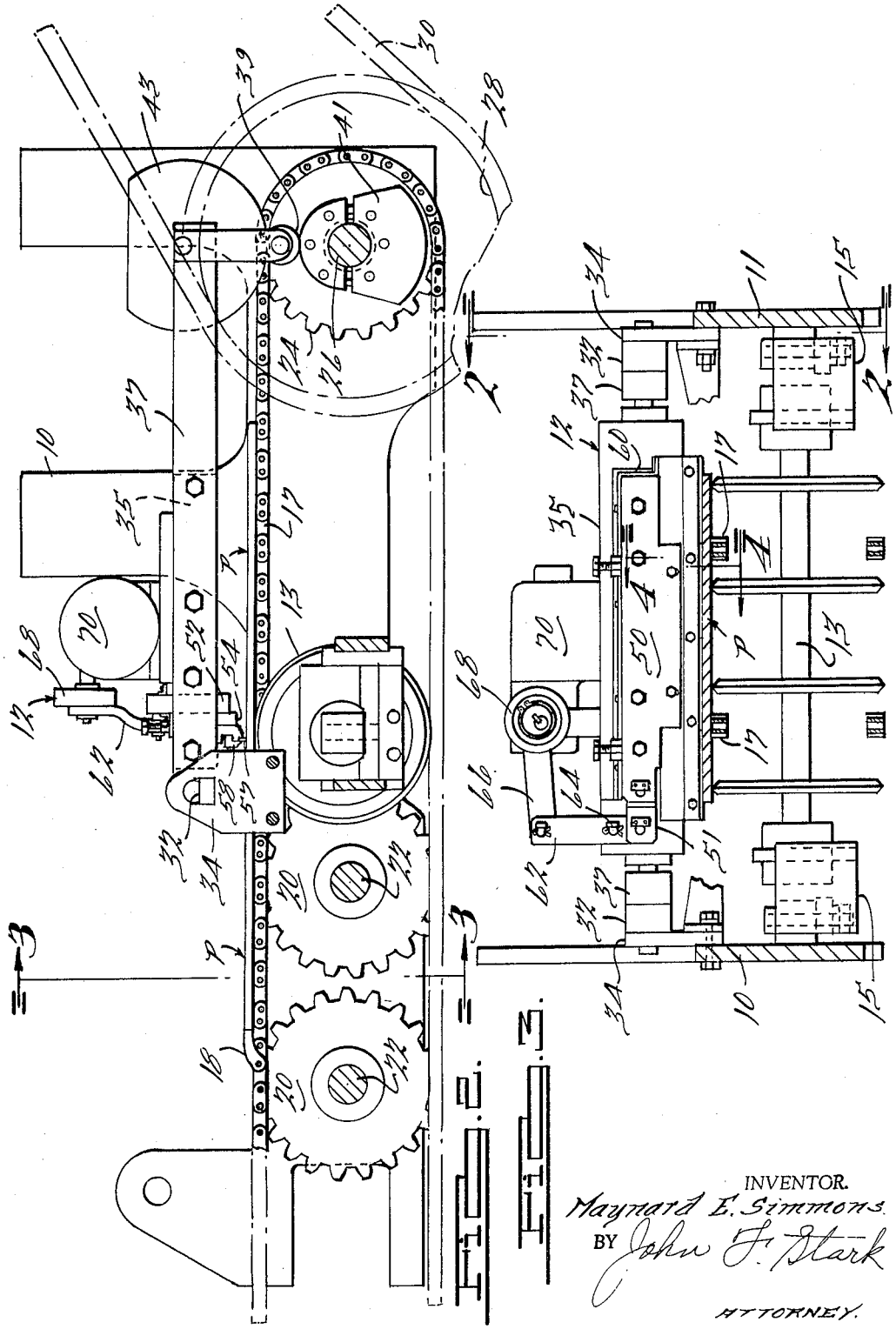
INVENTOR.
Maynard E. Simmons
BY John F. Stark
ATTORNEY.

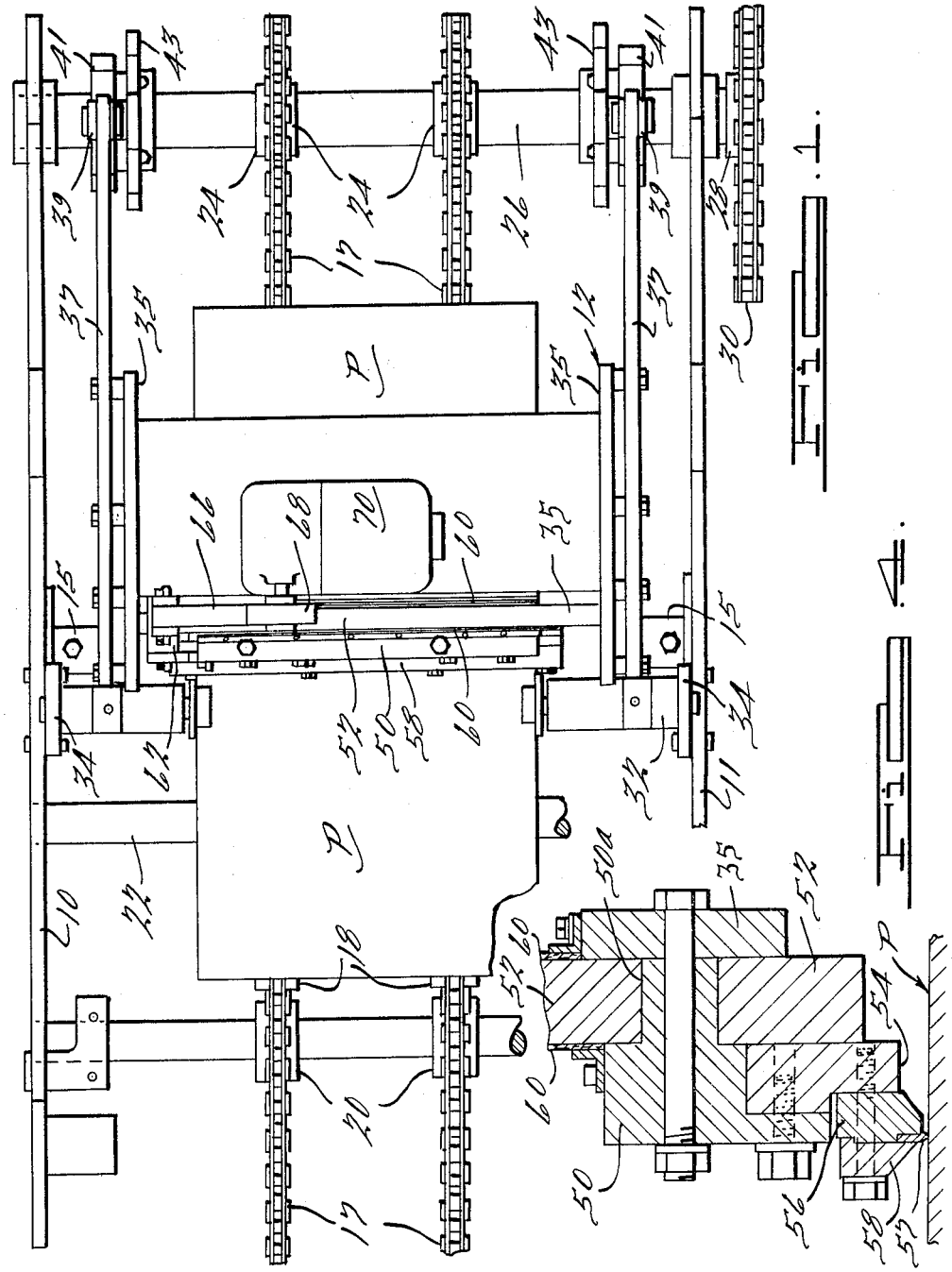

United States Patent Office 3,217,348
Patented Nov. 16, 1965

3,217,348
RECIPROCATING PALLET CLEANER
Maynard E. Simmons, Okemos, Mich., assignor to
Besser Company, Alpena, Mich.
Filed Sept. 13, 1963, Ser. No. 308,708
7 Claims. (Cl. 15—93)

This invention relates to pallet cleaners in general and, more particularly, concerns a pallet cleaner adapted to move pallets from a pallet magazine or supply hopper to a block molding machine.

Heretofore in the handling and reuse of pallets, for molding of concrete masonry units, the pallets were cleaned of encrusted or built-up aggregate flash by periodically running the pallets through a separate pallet cleaning machine which necessitated loss in downtime and expense to remove the build-up acquired in the block curing cycle through the kilns. Another method has been to employ a scraper blade mounted transversely of the pallet moving bars or conveyor chain and interposed between the pallet supply hopper or magazine and the molding station. Such an endless conveyor for moving the pallets one-at-a-time employs pallet contacting means or hardened "Stellited" lugs which advance the pallets from the hopper to the molding station. The encrusted aggregate is then cut off by a Carboloy tipped blade as the pallet is advanced thereby but with great load on the chain and wear and tear on the pallet engaging lugs. This problem is aggravated at times by the general condition of the corners and edges of the pallets, especially the leading edges thereof, which may become warped or bent due to rough handling incidental to block manufacture in a block plant. A further, though not so obvious, point is the trailing edge of the pallet being advanced through the cleaner, if warped downward, may expose a portion of the pallet-contacting lugs, which are hardened "Stellite," and the blade catching on these will either chip, shear off the lug or break the conveyor chain and its attendant loss in downtime.

The present invention solves the several problems aforementioned and provides a very efficient cleaning device by the addition of a reciprocating means to the scaper blade for movement in a direction transverse of path of pallet travel, while concurrently relieving tension load on conveyor chain, and through cam and roller means accommodating warped or bent pallet edges.

Accordingly, a principal object of the present invention is the provision of a pallet cleaner adapted to move pallets therethrough on an endless conveyor, in which a scraper blade mounted transversely of pallet travel path has powered means for reciprocating said blade to thereby grind off "flash" while concurrently chipping or cutting off encrusted residue on pallet advanced transversely thereunder; the provision in a device as above defined of tension relieving means on pallet conveyor means by said reciprocable blade.

A further object of the present invention is the provision of a pallet cleaning device having a scraper blade mounted transversely of pallet travel path including blade reciprocating means and pivotally mounted frame means which, in conjunction with synchronized powered cam and roller means, enable elevation of scraper blade to just clear leading and trailing edge of the pallet and in interim to clean working area of pallet.

A still further object of the present invention is the provision of a pallet cleaner device as above described, in which the transversely mounted reciprocable blade is weight loaded on pallet in cleaning relationship as pallet is advanced therethrough.

Other objects and advantages of the present invention will appear more fully hereinafter, it being understood that said invention consists substantially in the combinations, construction, location and general arrangement of parts, all as described in detail in the following specification, and as fully pointed out in the appended claims.

In the accompanying drawings, like reference characters refer to similar parts in the several views and in which:

FIG. 1 is a plan view of one form of pallet cleaning device with reciprocable transversely mounted blade which embodys the principles of the present invention;

FIG. 2 is a side elevational view of the cleaner of FIG. 1 on the line 2—2 of FIG. 3;

FIG. 3 is a front elevational view of the cleaner on the line 3—3 of FIG. 2;

FIG. 4 is an enlarged sectional view of the reciprocable cutter blade, holder and assembly on the line 4—4 of FIG. 3.

In FIGURES 1 and 2 portions of extensions of the side frames 10, 11 of a conventional Besser Vibrapac block machine (such as shown in Patent No. 2,692,418 issued to J. H. Besser, October 26, 1945) represents the power front delivery portion of the machine for conveying pallets from a pallet magazine or supply hopper, not shown, to a molding station beyond the pallet cleaner, generally designated 12. For conveying pallets from the pallet magazine to the molding station, not shown, a pallet anvil shaft assembly 13 is adjustably journalled vertically, as at 15, in the side frames 10, 11. Conveyor chain 17 with hardened "Stellited" lugs 18 at siutable spaced intervals engage a pallet P at the peripheral edges thereof. This conveyor chain 17 is trained over sprockets 20, which are keyed on rotatable shafts 22, suitably journalled in housings supported by side frame 10, 11. On the fore end the chain 17 is trained over sprockets 24 keyed to shaft 26, which is journalled at opposite ends in housing supported by side frames 10, 11. The shaft 26, at one end, is extended through side frame 11 and at the outer end of the shaft a sprocket 28 is keyed thereto and a chain 30 is trained over the sprocket 28 and extended to the block machine for driving the conveyor chain assembly 17 in timed relation to the block machine operation.

Stub shafts 32 pivotally journalled at 34 in the side frames 10, 11 support the pallet cleaner 12 and its frame 35. In this instance the frame 35 consists of side members and a tranverse member formed into a weldment, all generally referred to as frame 35, for simplicity. Bolted to opposite sides of the cleaner frame 35 adjacent the pivot points and extended longitudinally forward, are lever arms 37, upon the outer ends of one, or both as here, of which are secured rollers 39, which are actuated by cooperating cams 41 rotatably fastened to shaft 26 and driven thereby. Likewise secured to lever arms 37, at their forward ends, and inward from rollers 39 are weights 43 of predetermined value, for weight loading the pallet cleaner frame and blade in cutting relationship, as will be described hereinafter.

As best shown in FIGURES 1, 2, 3, in the cleaner frame 35 a scraper blade assembly is mounted transversely of the path of pallet travel and consists of a blade guide 50, suitable secured to frame 35, including a horizontally disposed support or "way" portion 50a for slidably receiving blade retainer 52 on its upper and lower portions thereof, as best shown in large section FIG. 4. Blade retained 52 has a shank member 54 bolted thereto for reception of scraper blade 56 and its Carboloy tipped edge portion 57 secured thereto by fastening means 58. Obviously, for replacement and sharpening purposes the Carboloy tipped edge may be one piece or in multiple sections. Sealing means and felt retainers 60 may be used to channel lubricants used to facilitate the reciprocable blade action.

On one end of blade guide assembly 50 a bifurcated end 51 is provided for reception and fastening of a link member 62, which is intermedially pivoted on support 64, and the other end of the link secured to a connecting rod 66. Connecting rod 66 has its outer end connected to an eccentric 68 which is operably connected to a gearhead or reduction motor 70 mounted on pivotally mounted frame 35. It will now be apparent the entire load of the cleaner, including weights 43, assists in weight loading the scraper blade in cutting relationship on the pallet.

In operation, a pallet P is advanced one-at-a-time from the pallet magazine by the chain 17 moving under open bottom of supply hopper and chain lugs 18 pushing or advancing a pallet to pallet cleaner 12 over the adjustably mounted pallet anvil shaft assembly 13 whch keeps the pallet in working relation to scraper blade 56, 57. As the leading edge of a pallet arrives adjacent the scraper blade, cam 41 and roller 39, synchronized through sprocket 28 and chain 30 to the machine, raises the pivotally mounted pallet cleaner frame 35, by means of the lever arms 37 secured thereto, just sufficiently to clear a pallet and immediately thereafter lower blade into cutting relationship on the working area of surface of the pallet. Since the weights 43 are disposed on outer ends of arms 37 an additional cutting pressure of selected value is achieved. As the trailing edge of pallet is about to pass under scraper blade, this raising and lowering action is repeated to avoid catching or hanging up of blade against "Stellited" lugs 18, in case the after edges of pallet are warped or bent downward. During passage of pallet P under the blade the motor 70, which may be timed to stop and start in conjunction with the machine time, as received through cam and roller 39, 41, or may be run continuously, is actively reciprocating the blade back and forth through its associated linkage to grind-off or cut encrusted concrete at the same time the pallet is being advanced thereunder.

It will be understood, of course, that the invention is susceptible of various changes and modifications which may be made from time to time, by those skilled in this art, without any departure from the general principles or real spirit thereof. Accordingly, it is intended to claim the same broadly, as well as specifically, as indicated in the appended claims.

I claim:

1. A pallet cleaning device comprising power actuated means to move pallets along a path through said cleaning device, a frame, an elongated scraper blade mounted for lengthwise reciprocation in said frame with its long edge arranged transverse to said path, power actuated means comprising cam and roller means operated in timed relation to presentment of leading and trailing edges of a pallet at a location closely adjacent said scraper blade for elevating said frame and scraper blade to just clear said pallet and in the interim for lowering said frame to weight-load said frame and blade on said pallet as it is advanced along said path thereunder, and power means for reciprocating said scraper blade transversely to said path as it rests on said pallet while said pallet is advanced along said path.

2. A pallet cleaning device comprising power actuated means to move pallets along a path through said cleaning device, a frame, an elongated scraper blade mounted for lengthwise reciprocation in said frame with its long edge arranged transverse to said path, power acuated means comprising cam and roller means operated in timed relation to presentment of leading and trailing edges of a pallet at a location closely adjacent said scraper blade for elevating said frame and scraper blade to just clear said pallet and in the interim for lowering said frame to weight-load said frame and blade on said pallet as it is advanced along said path thereunder, and power means comprising a gearhead motor and associated linkage connected to said scraper blade for reciprocating said scraper blade transversely to said path as it rests on said pallet while said pallet is advanced along said path.

3. A pallet cleaning device adapted for use with an endless conveyor having lugs thereon for moving pallets to a block molding machine, said pallet cleaning device comprising power actuated means to move pallets along a path through said cleaning device, a pivotally mounted frame, an elongated scraper blade mounted for lengthwise reciprocation in said frame with its long edge arranged transverse to said path, power actuated means to pivotally elevate said frame and scraper blade in timed relation to presentment of leading and trailing edges of a pallet at a location closely adjacent said scraper blade to just clear said pallet and in the interim for lowering said frame to weight-load said frame and blade on said pallet as it is advanced along said path thereunder, and power means carried by said frame for reciprocating said scraper blade transversely to said path as it rests on said pallet while said pallet is advanced along said path.

4. A pallet cleaning device adapted for use with an endless conveyor having pallet-contacting means thereon for moving pallets to a block molding machine; said pallet cleaning device comprising power actuated means to move pallets along a path through said cleaning device, a frame pivotally mounted on opposite sides thereof, an elongated scraper blade mounted for lengthwise reciprocation in said frame with its long edge arranged transverse to said path, lever arm means operably connected to said frame pivots at opposite sides thereof and having cam and roller means arranged at an outer end thereof, power actuated means to pivotally elevate said lever arm means, frame and scraper blade in timed relation to presentment of leading and trailing edges of a pallet at a location closely adjacent said scraper blade to just clear said pallet and in the interim for lowering said frame to weight-load said frame and blade on said pallet as it is advanced along said path thereunder, and power means carried by said frame for reciprocating said scraper blade transversely to said path as it rests on said pallet while said pallet is advanced along said path.

5. A pallet cleaning device adapted for use with an endless conveyor having pallet-contacting means thereon for moving pallets to a block molding machine; said pallet cleaning device comprising power actuated means to move pallets along a path through said cleaning device, a frame pivotally mounted on opposite sides thereof, an elongated scraper blade mounted for lengthwise reciprocation in said frame with its long edge arranged transverse to said path, lever arm means operably connected to said frame pivots at opposite sides thereof and having cam and roller means arranged at an outer end thereof, weight means carried at the outer ends of said lever arm means remote from said frame pivots effecting weight-loading of said cleaning frame on said scraper blade and said pallet, power actuated means to pivotally elevate said lever arm means, frame and scraper blade in timed relation to presentment of leading and trailing edges of a pallet at a location closely adjacent said scraper blade to just clear said pallet and in the interim for lowering said frame to weight-load said frame and blade on said pallet as it is advanced along said path thereunder, and power means carried by said frame for reciprocating said scraper blade transversely to said path as it rests on said pallet while said pallet is advanced along said path.

6. A pallet cleaning device adapted for use with an endless conveyor having pallet-contacting means thereon for moving pallets to a block molding machine; said pallet cleaning device comprising power actuated means to move pallets along a path through said cleaning device, a frame pivotally mounted on opposite sides thereof, an elongated scraper blade mounted for lengthwise reciprocation in said frame with its long edge arranged transverse to said path, lever arm means operably connected to said frame pivots at opposite sides thereof and having cam and roller means arranged at outer ends thereof, power actuated means to pivotally elevate said lever arm means, frame and scraper blade in timed relation to presentment of leading and trailing edges of a pallet at a location closely adjacent said scraper blade to just clear said pallet and in the interim for lowering said frame to weight-load said frame and blade on said pallet as it is advanced along said path thereunder, motor driven means mounted on said frame having an eccentric rotatively secured thereto connecting rod means secured to said eccentric on one end thereof, pivot arm means secured to said connecting rod at an opposite end thereof, and said pivot arm secured to said reciprocatable scraper blade beyond its pivot point for reciprocating said scraper blade transversely to said path as it rests on said pallet while said pallet is advanced along said path.

7. A pallet cleaning device adapted for use with an endless conveyor having pallet-contacting means thereon for moving pallets to a block molding machine; said pallet cleaning device comprising power actuated means to move pallets along a path through said cleaning device, a frame pivotally mounted on opposite sides thereof, an elongated scraper blade mounted for lengthwise reciprocation in said frame with its long edge arranged transverse to said path, lever arm means operably connected to said frame pivots at opposite sides thereof and having cam and roller means arranged at outer ends thereof, weight means mounted at outer ends of said lever arm means remote from said frame pivots effecting weight-loading of said cleaning frame on said scraper blade and the pallet, power actuated means to pivotally elevate said lever arm means, frame and scraper blade in timed relation to presentment of leading and trailing edges of a pallet at a location closely adjacent said scraper blade to just clear said pallet and in the interim for lowering said frame to weight-load said frame and blade on said pallet as it is advanced along said path thereunder, motor driven means mounted on said frame having an eccentric rotatively secured thereto, connecting rod means secured to said eccentric on one end thereof, pivot arm means secured to said connecting rod at an opposite end thereof, and said pivot arm secured to said reciprocatable scraper blade beyond its pivot point for reciprocating said scraper blade transversely to said path as it rests on said pallet while said pallet is advanced along said path.

References Cited by the Examiner
UNITED STATES PATENTS

| | | | |
|---|---|---|---|
| 495,324 | 4/1893 | Gerhracht | 15—77 X |
| 2,637,057 | 5/1953 | Moore | 15—93 |
| 2,824,320 | 2/1958 | Teel | 15—77 |

CHARLES A. WILLMUTH, *Primary Examiner.*

WALTER A. SCHEEL, *Examiner.*